United States Patent
Kohlmann et al.

(10) Patent No.: US 9,561,682 B2
(45) Date of Patent: Feb. 7, 2017

(54) MULTI COLOR-SHIFTING DEVICES COMPRISING A LAYER HAVING A MICROSTRUCTURED SURFACE AND A DIELECTRIC NON-CONFORMING LAYER

(75) Inventors: Paul T. Kohlmann, Windsor, CA (US); Alberto Argoitia, Santa Rosa, CA (US); Cornelis Jan Delst, Fairfax, CA (US)

(73) Assignee: Viavi Solutions Inc., Milpitas, CA (US)

( * ) Notice: Subject to any disclaimer, the term of this patent is extended or adjusted under 35 U.S.C. 154(b) by 1248 days.

(21) Appl. No.: 13/530,918

(22) Filed: Jun. 22, 2012

(65) Prior Publication Data

US 2012/0326430 A1   Dec. 27, 2012

Related U.S. Application Data

(60) Provisional application No. 61/500,432, filed on Jun. 23, 2011.

(51) Int. Cl.
| | |
|---|---|
| *G02B 5/18* | (2006.01) |
| *G02B 27/44* | (2006.01) |
| *B32B 5/16* | (2006.01) |
| *B42D 25/20* | (2014.01) |
| *C09C 1/00* | (2006.01) |
| *G02B 5/20* | (2006.01) |

(Continued)

(52) U.S. Cl.
CPC ............... *B42D 25/20* (2014.10); *B42D 25/29* (2014.10); *C09C 1/0057* (2013.01); *G02B 5/18* (2013.01); *G02B 5/1861* (2013.01); *G02B 5/201* (2013.01); *G02B 5/287* (2013.01); *B42D 2035/24* (2013.01); *C09C 2200/24* (2013.01); *C09C 2210/30* (2013.01); *Y10T 428/2991* (2015.01)

(58) Field of Classification Search
CPC ............... C09C 1/0057; C09C 2210/30; C09C 2200/24; G02B 5/18; G02B 5/1861; Y10T 428/2991
USPC .......................................... 428/403, 570, 573
See application file for complete search history.

(56) References Cited

U.S. PATENT DOCUMENTS

| 5,877,895 A | 3/1999 | Shaw et al. ................... 359/588 |
| 6,761,959 B1 | 7/2004 | Bonkowski et al. ......... 428/156 |

(Continued)

FOREIGN PATENT DOCUMENTS

| DE | 10232245 | 2/2004 | ............... G03H 1/02 |
| DE | 10232245 A1 | 2/2004 | |

(Continued)

OTHER PUBLICATIONS

European Search Report from corresponding EP application No. 12172029.6.

(Continued)

*Primary Examiner* — Holly Le
(74) *Attorney, Agent, or Firm* — Harrity & Harrity, LLP

(57) ABSTRACT

A color shifting security device has a Fabry-Perot type structure wherein a dielectric layer is disposed between a reflector and an absorbing layer. The absorber and reflector layers may be conforming and the dielectric layer therebetween is non-conforming, filling the regions in the micro structured adjacent absorbing or reflecting layer, at least one of which has a microstructure therein or thereon. By having the dielectric layer not conform to the microstructure it is next to, its thickness varies in cross section, which allows for different colors to be seen where the thickness varies.

20 Claims, 14 Drawing Sheets

(51) Int. Cl.
G02B 5/28 (2006.01)
B42D 25/29 (2014.01)

(56) References Cited

U.S. PATENT DOCUMENTS

| | | | |
|---|---|---|---|
| 7,054,042 B2 | 5/2006 | Holmes et al. | 359/2 |
| 7,405,879 B2 | 7/2008 | Wild et al. | |
| 7,630,109 B2 | 12/2009 | Phillips et al. | 359/2 |
| 2005/0175815 A1* | 8/2005 | Wild | G03H 1/0244 |
| | | | 428/156 |
| 2006/0285184 A1* | 12/2006 | Phillips | B42D 25/328 |
| | | | 359/2 |
| 2007/0211317 A1 | 9/2007 | Heim | 359/2 |

FOREIGN PATENT DOCUMENTS

| | | | |
|---|---|---|---|
| EP | 1498545 | 1/2005 | D21H 21/42 |
| WO | 2010096914 | 9/2010 | B44F 1/12 |
| WO | 2013079542 | 6/2013 | G02B 5/28 |

OTHER PUBLICATIONS

Chinese Examination Report of corresponding Chinese Patent Application No. 201210211931.7 mailed on Dec. 23, 2015.
Chinese Examination Report of corresponding Chinese Patent Application No. 201210211931.7 mailed on May 27, 2016.

* cited by examiner

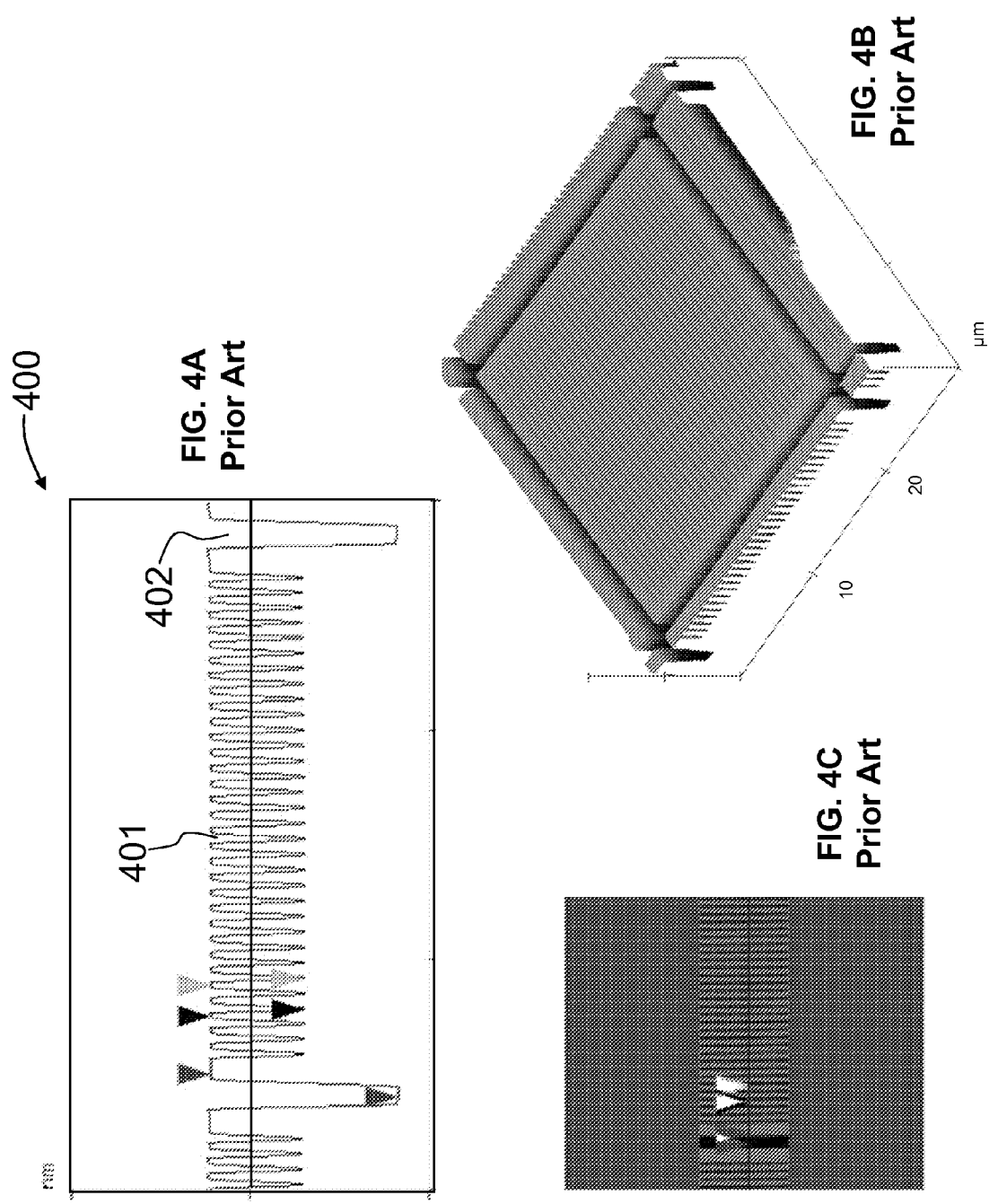

MULTI COLOR-SHIFTING DEVICES COMPRISING A LAYER HAVING A MICROSTRUCTURED SURFACE AND A DIELECTRIC NON-CONFORMING LAYER

The present invention claims priority from U.S. Provisional Patent Application No. 61/500,432 filed Jun. 23, 2011, which is incorporated herein by reference.

FIELD OF THE INVENTION

This invention relates generally to thin film color shifting devices and more particularly to a multilayer color-shifting device having a non-conforming dielectric spacer layer having a varying thickness.

BACKGROUND OF THE INVENTION

Security devices are being used more and more to protect currency and other valuable documents such as passports, drivers' licenses, green cards, identity cards and the like. These security devices are also used to protect commercial products such as pharmaceuticals, cosmetics, cigarettes, liquor, electronic media, wearing apparel, toys and spare parts for automobiles and aircraft from counterfeiting. In fact, it is estimated that counterfeit articles now comprise between 5% and 7% of world trade. Holograms attached to such articles have been the traditional method to foil counterfeiters.

Color shifting pigments and colorants have been used in numerous applications, ranging from automobile paints to anti-counterfeiting inks for security documents and currency. Such pigments and colorants exhibit the property of changing color upon variation of the angle of incident light, or as the viewing angle of the observer is shifted. The primary method used to achieve such color shifting colorants is to disperse small flakes, which are typically composed of multiple layers of thin films having particular optical characteristics, throughout a medium such as paint or ink that may then be subsequently applied to the surface of an object.

U.S. Pat. No. 6,761,959 incorporated herein by reference for all purposes, to Phillips et al, assigned to JDS Uniphase Corp. discloses a security article having Chromagram™ thereon. The Chromagram™ provides both color shifting and holographic effects to the viewer. In the '959 patent an organic substrate stamped with a holographic grating or pattern is coated with a color shifting multilayer film.

U.S. Pat. No. 7,630,109 in the name of Phillips et al, assigned to JDS Uniphase Corp., incorporated herein by reference for all purposes, discloses a more complex type of Chromagram™ wherein patterning is shown. In some regions, holographic effects are shown, and in other regions only color shifting effects are visible. In Phillips '109 patent a multilayer thin film filter is disclosed an organic dielectric layer serving as a spacer layer in a Fabry-Perot structure. The dielectric has embossed regions of varying thicknesses wherein the thickness within a region is substantially uniform. Each different region of a different thickness produces a different color shift. The size of one of the embossed adjacent regions is such that the color of said one region is uniform and cannot be seen by a human eye as different in color from the uniform color of an adjacent region thereto, and wherein the color within a region can be seen with magnification of at least 10:1. Phillips' teaches a Fabry-Perot device with a variable thickness dielectric layer by embossing the dielectric material to various thicknesses.

Since the dielectric in regions a, b, and c as shown in FIG. 1 of the '109 patent are purposefully embossed with different thicknesses, light reflecting back to the viewer after impinging upon the reflector will be three different distinct colors. However due to the small size of the regions a, b, and c, the eye will tend to integrate and if the pixel or region defined by (a) through (d) inclusive can be seen; only a single color will be perceived. With sufficient magnification, the individual regions (a), (b), and (c) will be seen and different colors will be perceived.

Another United States patent application which discloses diffraction gratings with color shifting coatings but deviates from the teaching of Phillips et al, is U.S. Pat. No. 7,054,042, incorporated herein by reference, in the name of Holmes et al. U.S. patent '042 appears to deviate from the teaching of Phillips in that a decoupling layer is taught as way in which to separate the diffraction grating effects from the color shifting effects. Holmes suggests placing a decoupling layer between the relief structure and the thin film reflection filter, which is described to be a thin film reflection filter.

In all of these aforementioned security structures, conventional application of the coating is suggested, for example by vacuum deposition to yield conforming layers. The prior art teaches first stamping a substrate, and subsequently applying the coating layers required to create the desired patterns of reflective and color shifting coatings.

This invention deviates from the prior art teaching by using conforming coatings with non-conforming coatings on substrates having structures thereon. In preferred embodiments the structures stamped or formed upon the substrate layer are so small, for their effects to be seen, magnification is required, however in other less preferred embodiments the structures may be large enough that they can be seen without magnification when coated. By way of example logos and other readable discernible indicia are provided on these substrates and are highlighted by providing thin film coatings that contrast particular regions.

This invention provides a thin film structure that is coated on a substrate wherein the dielectric spacer layer has a varying thickness. The provision of a dielectric layer with a varying thickness has been disclosed not only by Phillips in U.S. Pat. No. 7,630,109 but also much earlier in U.S. Pat. No. 5,877,895 incorporated herein by reference for all purposes, issued in the name of Shaw et al. Mar. 2, 1999. Shaw et al disclose applying heat variably to create a dielectric layer of varying thickness.

In contrast to the prior art which uses a stamped substrate as a spacer layer coated on one side with a reflector and on another side with an absorbing layer, an embodiment of this invention uses non-conforming dielectric layer coated on a same side of a microstructured substrate as a reflective layer and absorbing layer. Therefore the Fabry-Perot structure is supported by the substrate. This provides numerous advantages. One advantage is that the coating can be removed from the substrate if coated with a release layer. Furthermore this coating can be made into shaped flakes if carefully removed from the substrate.

The Fabry-Perot structure of this invention provides different color shifting regions adjacent to one another which |preferably differ in their color from one another by at least a delta E value of 10.

It is an object of this invention to provide a device, which exhibits different color shifting regions, visible with magnification, wherein adjacent color shifting regions provide a color shift between two distinct different colors due to the dielectric spacer layer having a varying thickness.

It is an object of this invention to provide a substrate having relief structures across its surface so that a cross section thereof has a varying thickness, and to mirror that varying thickness by applying a non-conforming layer filling depressions, valleys and troughs with a dielectric material so as to provide a Fabry-Perot structure having a spacer layer which provides color shift differences corresponding to the thickness of the substrate.

It is an object of this invention to provide at least one conforming layer and a non-conforming layer to fabricate a Fabry-Perot color-shifting filter, and wherein a substrate supporting the Fabry-Perot filter is purposefully embossed with a predetermined pattern to provide encoding that will form color-shifting indicia within the filter.

It is a further object of this invention to provide a flake having a non-conforming dielectric layer with at least one conforming layer and another conforming or non-conforming layer, wherein the flake is a color shifting device.

SUMMARY OF THE IN INVENTION

In accordance with the invention there is provided a color shifting security device comprising: a first absorbing or reflecting layer having a microstructured surface; a second absorbing or reflecting layer; and a dielectric non-conforming layer disposed between the first absorbing or reflecting layer and the second absorbing or reflecting layer having a surface contacting and complementary with the microstructured surface, wherein at least one of the first and second layers is an absorbing layer, and wherein a cross section of the dielectric non-conforming layer has a varying thickness such that at least one region is substantially thicker than a thinner adjacent region of said layer, and wherein a visible color difference is seen when viewing the filter through the one region and the adjacent region from a same location simultaneously when light is incident upon the filter.

In a preferred embodiment of the invention the first absorbing or reflecting layer, or the second absorbing or reflecting layer, has a substantially uniform thickness, which varies by no more than 20% and or the difference in thickness of cross-section of the dielectric non-conforming layer is more than ⅛ wavelengths of visible light and less than 8 quarter wavelengths of visible light.

In a particular embodiment the regions of the device corresponding to particular microstructures form visible indicia that can be seen with magnification, and wherein the height or depth of some of the microstructures are at least 50 nm.

In accordance with this invention a security device is provided comprising: a Fabry-Perot cavity having: a first layer having a microstructured upper surface, a second layer and a deposited dielectric non-conforming layer having an upper surface and a lower surface disposed between the microstructured upper surface of the first and second layer, wherein the lower surface of the dielectric layer conforms to the microstructured upper surface of the first layer and where the upper surface of the dielectric layer does not conform to the microstructured surface of the first layer, wherein a cross section of the dielectric layer has a varying thickness such that at least one region is substantially thicker than an adjacent region, wherein the first and second layers are absorber layers or one of the first and second layers is a reflector layer and the other of the first and second layers is an absorber layer.

In accordance with this invention a color shifting security device is provided, which exhibits two different colors from a same viewing location comprising one or more deposited layers forming a microstructure, wherein at least one of the layers is a reflecting or absorbing layer, an infill non-conforming dielectric material filling in grooves within the microstructure to form a planar surface over a continuous region of the microstructure; and an absorbing or reflective cover layer covering at least a part of the continuous region, wherein the one or more deposited layers or the cover layer is an absorber layer.

In accordance with another aspect of the invention a method is provided of fabricating a security device comprising providing a microstructured substrate, coating the microstructured substrate with a first reflective or absorbing coating which conforms to the microstructure substrate, coating the reflective or absorbing coating with a non-conforming dielectric leveling coating which at least partially fills voids within the microstructured coating, and coating the non-conforming dielectric leveling coating with a second absorbing coating or a reflective coating, wherein one of the first and second coatings are an absorbing coating.

In a particular embodiment the aforementioned color shifting structure is a flake.

BRIEF DESCRIPTION OF THE DRAWINGS

Exemplary embodiments of the invention will now be described in conjunction with the drawings in which:

FIG. 2b is an isometric view of the prior art structure of FIG. 2a.

FIG. 3b is an isometric view of the prior art structure of FIG. 3a.

FIG. 4a is a cross-sectional view of a prior art substrate having grooved frames and a grooved grating across its surface.

FIG. 4b is an isometric view of the prior art structure of FIG. 4a.

FIG. 4c is a plan view of the prior art structure shown in FIG. 4b.

DETAILED DESCRIPTION

Figure 1:
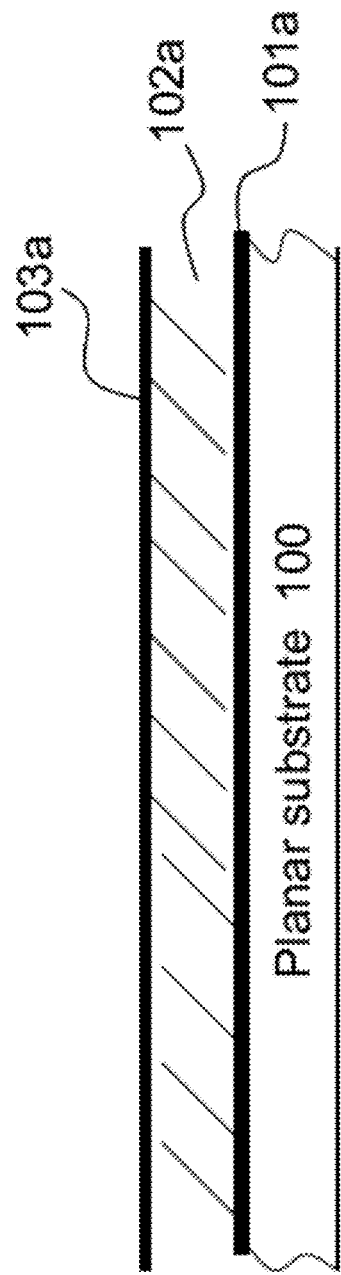
FIG. 1 is cross-sectional view of a prior art three-layer Fabry-Perot cavity.

The invention is related to the use of thin dielectric non-conforming layers on microstructured surfaces allowing for the manufacturing of devices having micro areas of different color shifting. The different colors are obtained by thin film interference when the thickness of the dielectric layer varies in different regions. Different color shifting refers to a different range of colors; for example due to the thickness of the spacer layer in different regions of the device, one region may shift from orange to brown and another region may shift from gold to green.

Conforming deposited layers are obtained when the species in the vapor phase condenses as a solid. This is the case of most of the metals and their compounds; when oxides, nitrides, carbides, fluorides, combinations, etc. are deposited by standard vacuum physical vapor deposition, sputtering and evaporation, or by chemical vapor deposition.

Once the species in the vapor phase condenses on a substrate, there is not enough mobility of the condensed species in the form of mobile atoms, radicals or molecules. Therefore the condensed species will be fixed on the surface of the substrate following the original roughness of the substrate.

In contrast, a non-conforming layer will act similar to a layer of water resting upon a surface, filling any roughness of the surface to create a planar surface independently of the roughness of the surface. When water is solidified, for example by freezing in optimal conditions when the layer is not disturbed during the freezing process, the solid layer will present the smoothness of the original water liquid layer. Water will fill in any voids and will yield a planar upper surface.

Although the illustrative example of water allows one to envisage how a non-conforming layer behaves, other materials, in particular some selected monomers exhibiting similar behavior, provide the smoothing or planarizing properties in the liquid state and can be solidified by a post polymerization stage by ultra-violet (UV) or electron radiation. Selected light transmissive monomers having preferred properties such as a suitable refractive index can be used as a spacer layer in a Fabry-Perot filter.

To deposit monomers they are heated within a container so as to produce a vapor. When the vapor makes contact with a cooler surface in proximity it condenses upon the cooler surface. Therefore, non-conforming layers are obtained when a monomer in the gas phase is brought into contact with a cooled substrate whereby the gas phase condenses forming a liquid layer. In accordance with this invention, the liquid layer supported by the substrate is subsequently cured, producing the polymerization of the liquid monomer into a solid layer.

The monomer can be evaporated by heating it in a reservoir with an aperture or nozzle used to build the desired pressure of the monomer vapor before it expands in the vacuum chamber. If the vapor pressure of the monomer is not high enough to produce a gas stream directed at the substrate, an inert gas can be introduced into the liquid monomer. In an alternative embodiment, the liquid monomer can be directly sprayed in a hot reservoir to be instantaneously evaporated to achieve flash evaporation. Care must be taken to ensure that the temperature of the reservoir is low enough to avoid degradation of the monomer or its thermal polymerization.

Although evaporation is the preferred method of depositing the dielectric monomer, printing, painting, extrusion, spin-off, or the use of a doctoring-blade, may be considered; however, often these technologies have the tendency to form layers that are too thick to create interference for visible wavelengths of light. Various monomers and/or oligomers can be used as non-conforming layers in this invention. By way of example, the non-confirming layer can be formed using any of the following materials: epoxy acrylates, urethane acrylates, polyester acrylates, polyether acrylates, amine modified polyether acrylates, acrylic acrylates and miscellaneous acrylate oligomers.

This invention provides a method for fabricating one or more thin-film Fabric-Perot interference devices upon a microstructured substrate that will exhibit a color change when irradiated with visible light when the angle of incidence or viewing angle changes.

Referring now to prior art FIG. 1 a three-layer Fabry-Perot cavity is shown. The substrate 100 has deposited thereon a conforming layer 101a of a highly reflective material such as Al. Deposited on the aluminum layer 101a is a dielectric conforming layer 102a. A conforming absorber layer 103a is subsequently deposited on the dielectric layer 102a. Using conventional vacuum coating techniques results in a thin film optically variable filter upon a substrate wherein each layer has a substantially uniform thickness. Notably, since the surface of the substrate is flat, each layer will be a uniform thickness whether conforming layers or non-conforming layers are deposited, providing a same optical effect when applied to a planar surface such as that in FIG. 1. However, the optical effects obtained for conforming or non-conforming layers will be different when the substrate has a microstructured surface. Non-conforming layers will fill in voids where conforming layers simply conform to the microstructured surface so that they are substantially uniform in thickness.

In operation, a thin-film Fabry-Perot filter functions as a color changing element; as the angle of light incident upon the cavity is varied between the light source and the viewer, the color varies as a function of the path length through the dielectric layer varying with the change in angle.

Figure 2A:
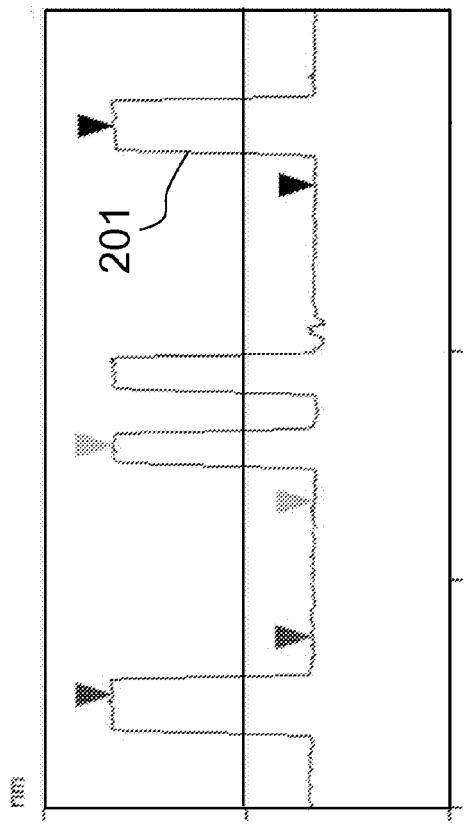
FIG. 2a is cross-sectional view a prior art substrate having frames in relief as upstanding walls extending from the substrate surface and an upstanding logo.
Figure 2B:
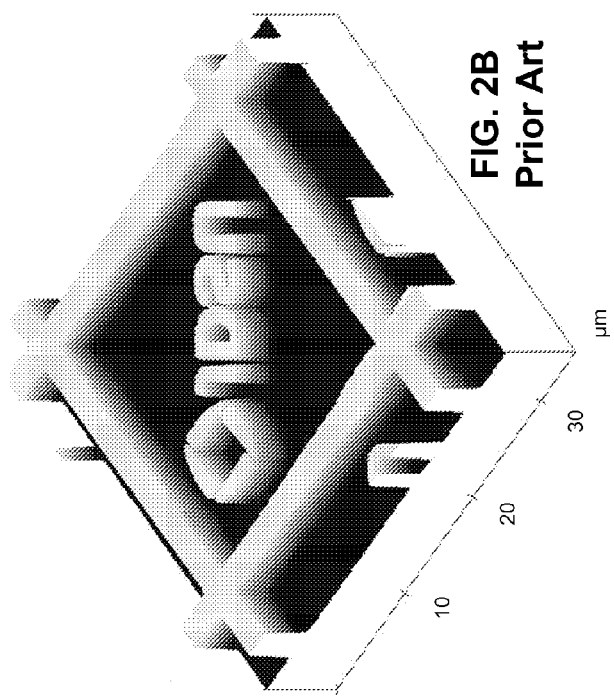
Figure 2C:
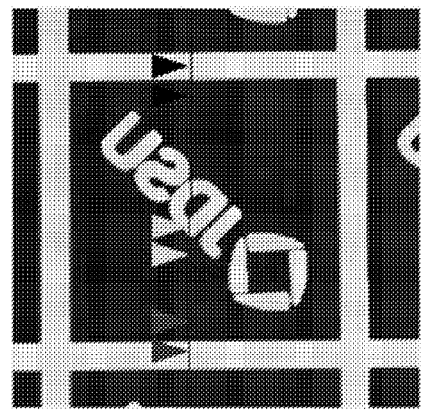
FIG. 2c is a plan view of the prior art structure shown in FIG. 2b.

Turning now to FIG. 2a a substrate is shown in cross-section where microstructures 201 pointing upward from the substrate are shown, and wherein the height of the upstanding structures is uniform. A three dimensional perspective isometric view is shown in FIG. 2b and a top view is shown in FIG. 2c.

Figure 3A:
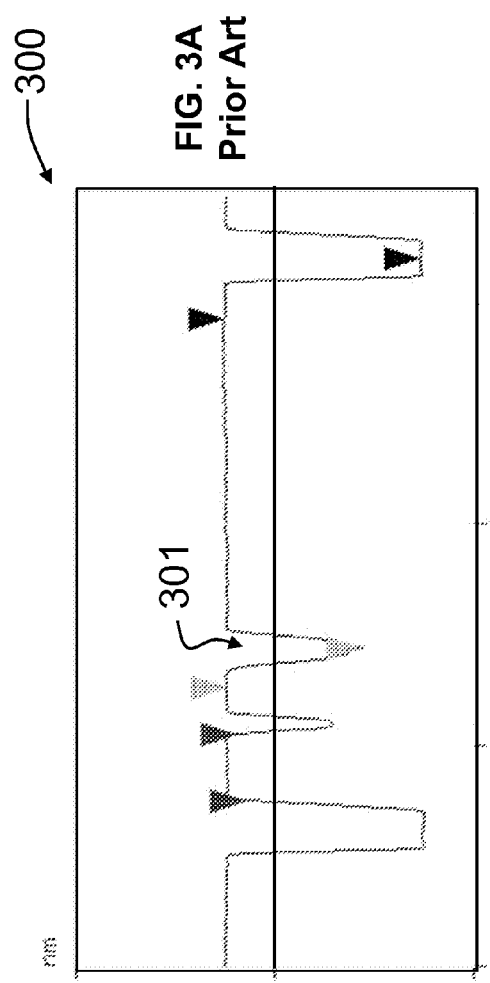
FIG. 3a is a cross-sectional view of a prior art substrate having grooved frames and a grooved logo.
Figure 3B:
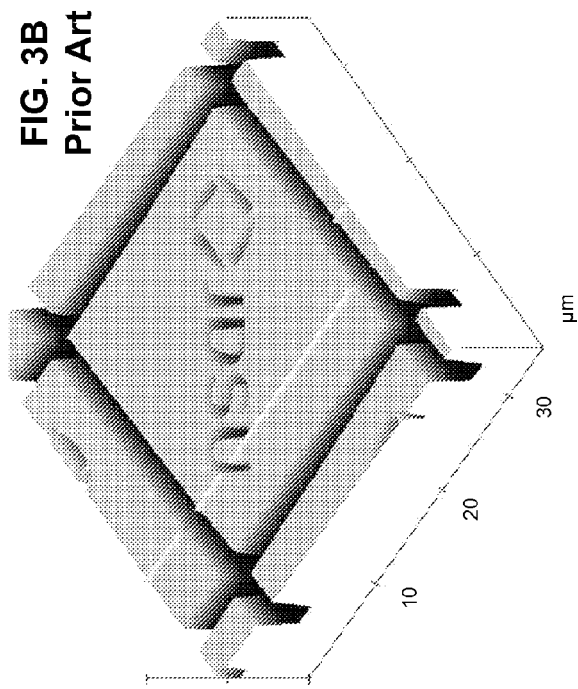
Figure 3C:
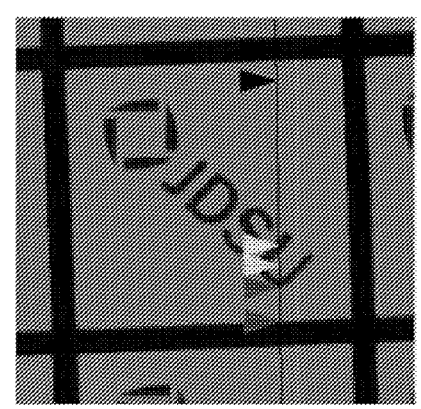
FIG. 3c is a plan view of the prior art structure shown in FIG. 3b.

FIGS. 3a through 3c illustrate an embodiment wherein the microstructures within the substrate 300 are in the form of grooves 301 of varying depth within the substrate.

Figure 4D:
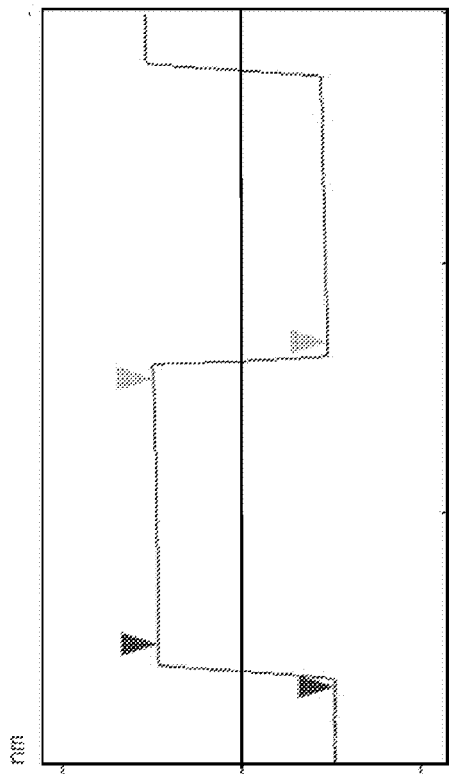
FIG. 4d is a cross-sectional view of a substrate having a squared array of peaks and valleys.
Figure 4E:
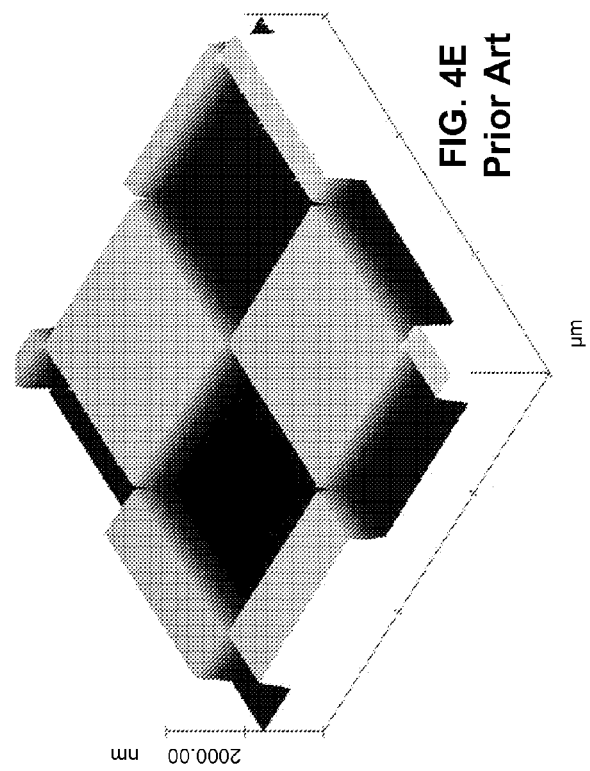
FIG. 4e is an isometric view of the prior art structure of FIG. 4d.
Figure 4F:
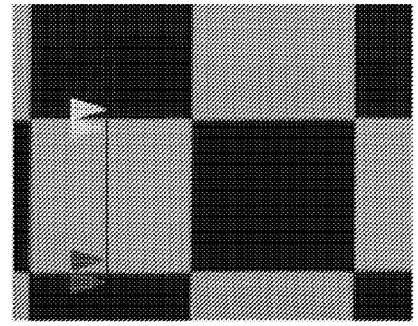
FIG. 4f is a plan view of the prior art structure shown in FIG. 4d.

FIGS. 4a through 4c show a substrate 400 wherein a grating formed of grooves 401 of a first depth are bound by deeper framing grooves 402 within the substrate.

Figures 5A, 5B:
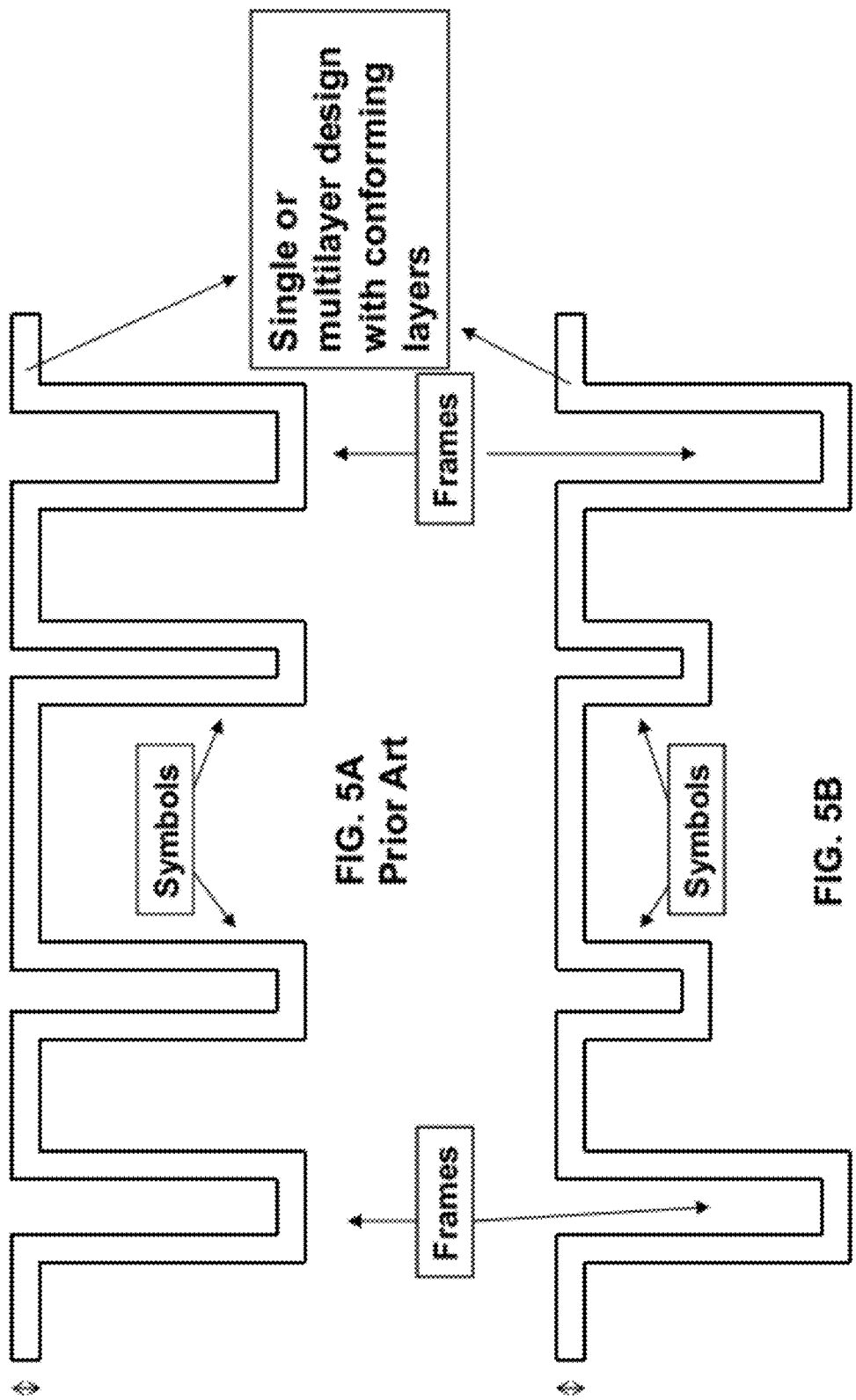
FIG. 5a is a prior art cross-section of a microstructured foil wherein symbols are a same depth and wherein the coating is a uniform thickness.
FIG. 5b is a prior art cross-section of a microstructured foil wherein symbols are a same depth and wherein the coating is a non-uniform thickness.

FIGS. 5a and 5b show a cross section of a substrate coated with a coating material where the layer has been grown atom by atom by conventional vacuum coating processes as evaporation and sputtering. The layer conforms to the substrate following the original microstructure of the surface. If for example a 3 layer R/D/A is coated, the same color by thin film interference will be seen everywhere in the substrate since the thickness of the dielectric is constant as shown in FIG. 6.

Figure 6:
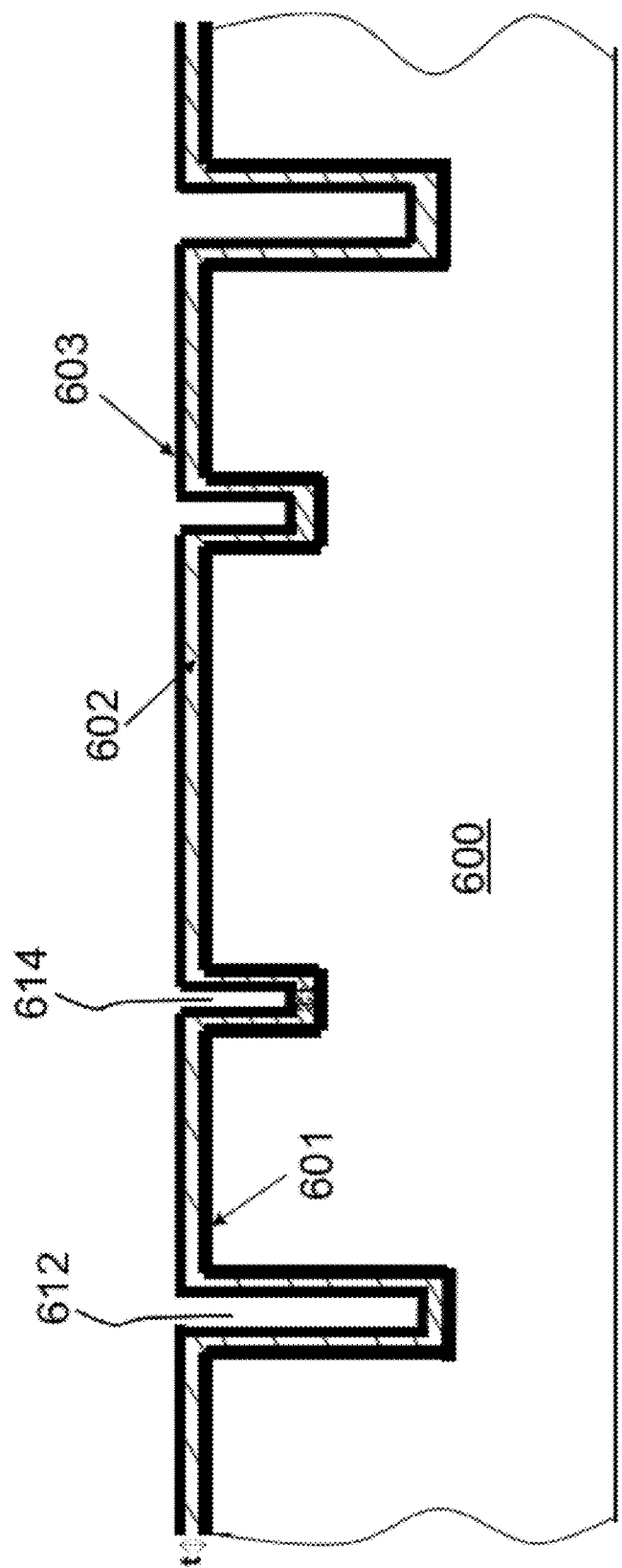
FIG. 6 is a prior art microstructured substrate having grooves therein coated with three conforming layers forming a Fabry-Perot color shifting coating.

Referring now to prior art FIG. 6 a substrate 600 having embossed grooves 612 and 614 of varying depth shows a reflector layer 601 of a first uniform thickness, a dielectric layer 602 of a second uniform thickness, and an absorber layer 603 of a third uniform thickness coated over the substrate 600 wherein of the layers are conforming layers.

Figure 7:
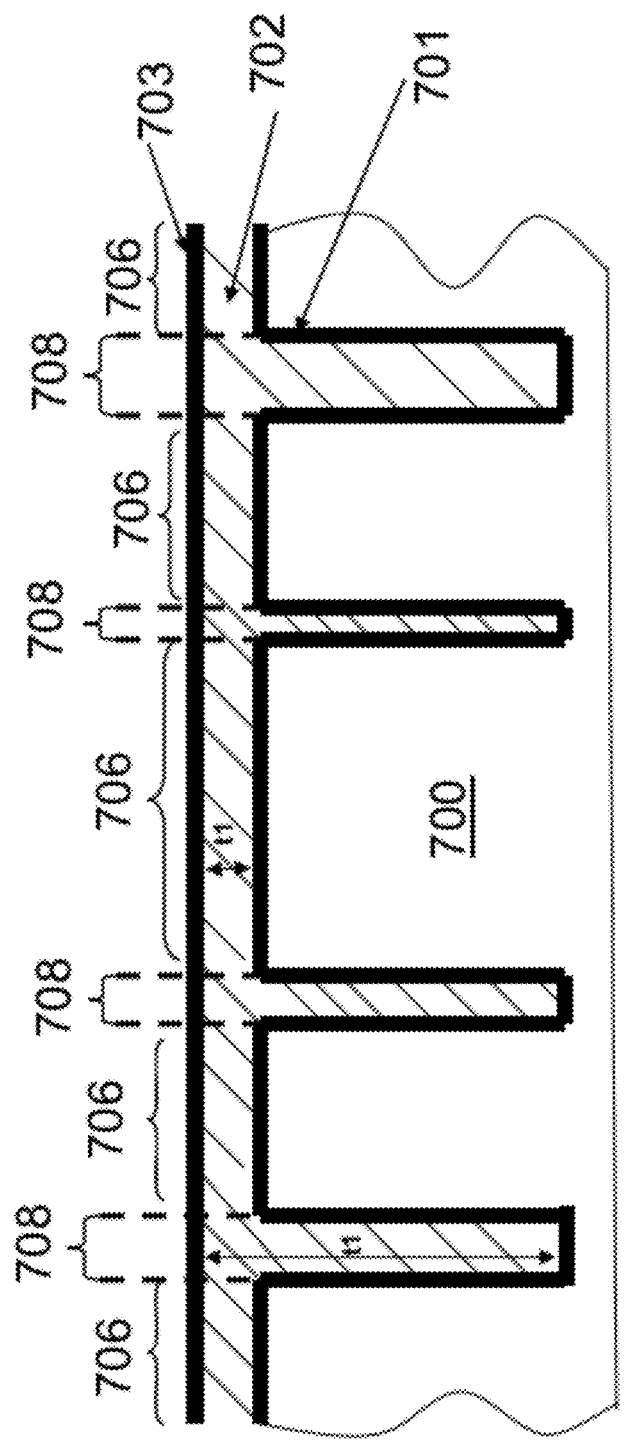
FIG. 7 is a cross-sectional view of a microstructured structure having a conforming reflector layer, a non-conforming dielectric layer and an absorber layer together forming a Fabry-Perot structure in accordance with this invention wherein two different alternating color shifting regions are provided due to the difference in thickness of the non-conforming dielectric layer.

A first embodiment of the invention is shown in FIG. 7 wherein the same substrate as shown in FIG. 6 is used however one of the coating layers in FIG. 7 is non-conforming providing a functionally differing device from FIG. 6. Turning now to FIG. 7 a substrate 700 is shown having a conforming reflector layer 701 of uniform thickness coated directly thereon. Upon the reflector layer is a non-conforming coating of dielectric material, which fills in the grooves within the reflector coated substrate and has an upper substantially planar layer. As a result the dielectric layer 702 has a varying thickness, in cross-section, as shown. Two different thicknesses result when the dielectric layer is coated over substrate 700 due to the two different depths within the microstructured substrate 700. The two different depths of the dielectric spacer layer provide two different color shifting regions, where the color shifts from a different first color, to a different second color in the regions of different thickness. For a perceivable color difference to be seen in the two regions of different thickness, a thickness difference in the spacer or dielectric layer, is required. As can be seen in FIG. 7 the thickness difference in the spacer layer is considerably larger than the combined thickness of the adjacent two layers 703 and 701. An absorber layer 703 having a substantially uniform thickness is shown over the dielectric layer 702. The absorber layer 703 could be a conforming layer or a non-conforming layer since it is a planar layer applied onto a planar surface. However, preferably, a conforming absorber layer is used, typical of conventional color-shifting filters. The thickness of the dielectric layer can be selectively controlled by providing microstructures having selectively chosen depths or protuberances in the form of upstanding features, as the dielectric layer essentially fills in voids resulting in a varying of its thickness. In FIG. 7 color shifting regions 706 having a first color shifting range of colors and color shifting regions 708 have a second color shifting range of colors. Typical thickness ranges for the absorber layer would be 20 Angstroms to 150 Angstroms depending upon which metal was selected. The reflectivity of the reflector layer is preferably at least 20% to provide an adequate visual effect from the device and the dielectric spacer layer could vary be as much as 800 nm.

When a non-conforming or conforming dielectric is applied to a single level macrostructure surface such as that of FIG. 1, two different colors will be produced by thin film interference corresponding to the different thickness of the planarizing dielectric layer as the angle of incidence increases. Notice that the reflector and absorber layers applied are conforming layers. Since a dielectric polymeric layer tends to have an index of refraction in between 1.5 and 1.7, the thin-film interference will produce colors that shift from high to low wavelengths as the angle of illumination increases.

Advantageously, a release layer can be applied in between the substrate and the deposited layers with the intention to strip off the multilayer to make micro multi-color shifting microstructured pigment flakes. The release layer can also be used to transfer the multilayer to another object. If the device is intended to make thread, yarn, or foils it may not require the use of release layers. Such flakes are typically less than 100 mm or equal thereto, across a longest length. The difference shown in the figures between the two dielectric thicknesses are exaggerated. The aspect ratio for the microstructured character is 100-500 nm of depth for a line width that is typically 1-5 um.

The microstructure within the substrate can represent symbols, logos, grating, frames, peaks/valleys, etc. as shown in FIGS. 2a through 3c. Advantageously the color shifting coating provides a way in which these features, such as logos, etc., can be enhanced.

Figure 8:
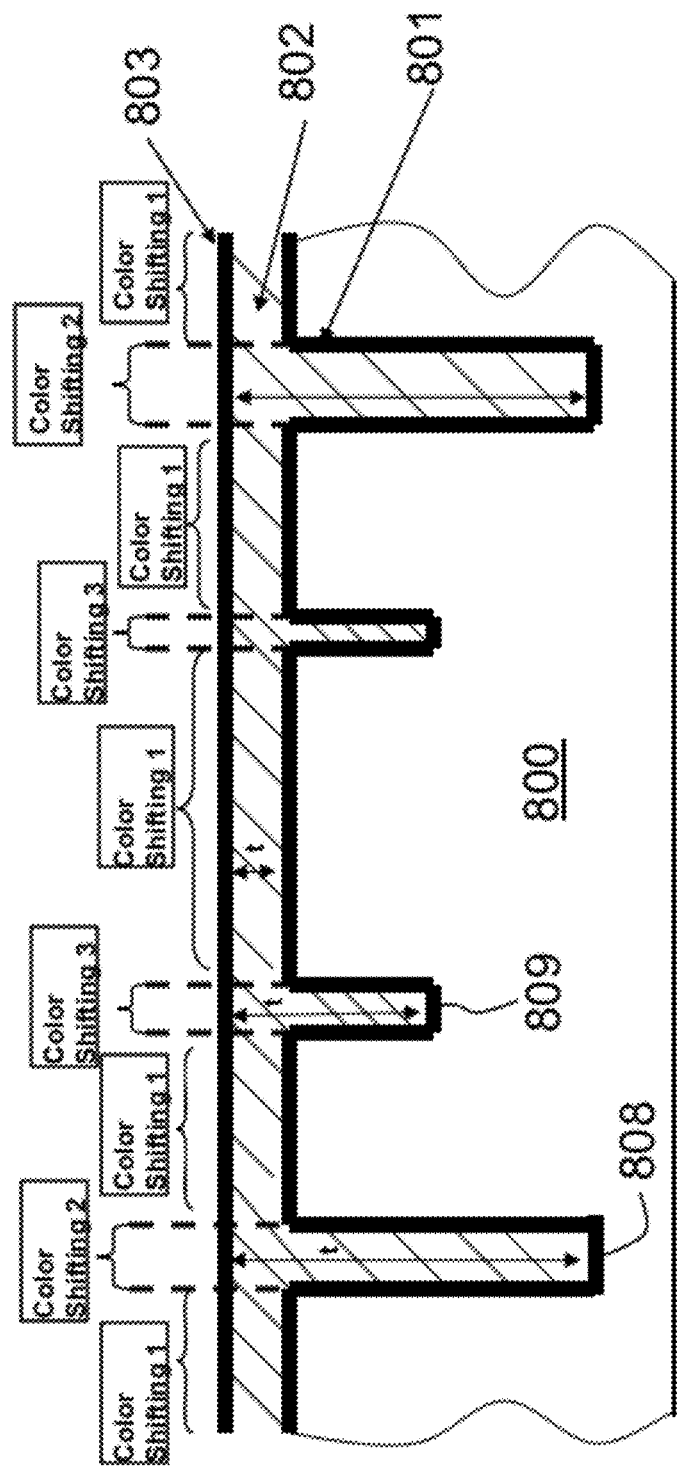
FIG. 8 is a cross-sectional view of a microstructured structure having a conforming reflector layer, a non-conforming dielectric layer and an absorber layer together forming a Fabry-Perot structure in accordance with this invention wherein three different alternating color shifting regions are provided due to the difference in thickness of the non-conforming dielectric layer.

Turning now to FIG. 8 a second embodiment of the invention is shown wherein grooves 808 and 809 in substrate 800 are of two different depths. When the non-conforming dielectric layer 802 is deposited over the conforming reflector layer 801 and an absorbing layer 803 is applied thereover, the resulting structure is a Fabry-Perot color-shifting filter having three distinct ranges of color shifting. The non-conforming layer provides a planarizing smoothing effect upon which layer 803 is deposited conforming to this planarized layer. As the number of distinct levels or depths within the microstructure increases the number of ranges of color shifting increases accordingly.

Figure 9:
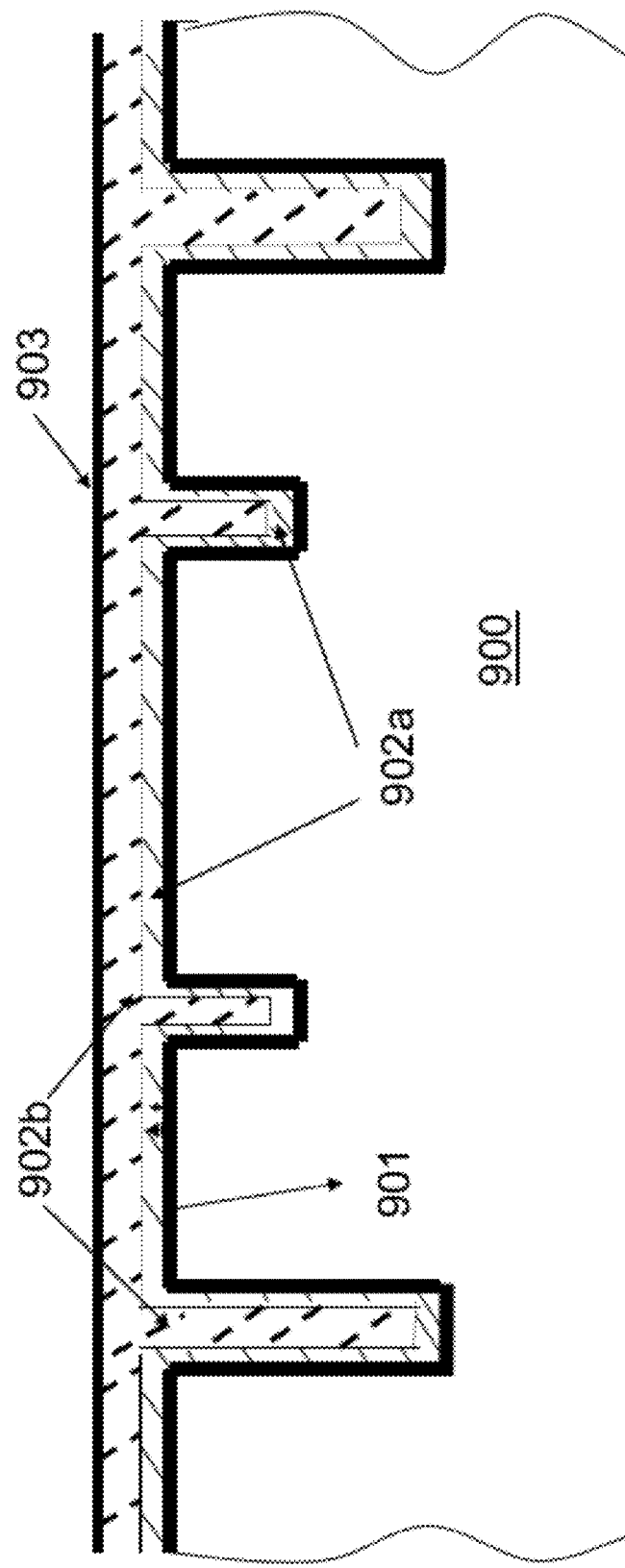
FIG. 9 is a cross-sectional view of an embodiment of the invention wherein a Fabry-Perot structure in the form of a microstructured foil has a conforming dielectric layer adjacent to a non-conforming dielectric layer.

FIG. 9 illustrates an embodiment of the invention wherein a microstructured substrate 900 is coated with a conforming reflector layer 901 and where conforming and non-conforming dielectric layers 902a and 902b respectively are used adjacent to one another in a same device. A planar absorber layer 903 is coated over the non-conforming dielectric layer 902b. This planar layer 903 could be a conforming or a non-conforming layer since it is being applied to a planar surface. In this device three different color ranges are seen due to the three thicknesses of the combined dielectric layers. As mentioned previously, generally non-conforming polymeric dielectric layers have a lower refractive index than standard inorganic oxides layers. By using a judiciously selected combination of a high refractive index inorganic dielectric with a lower refractive index polymer dielectric further control the color shifting properties can be attained. FIG. 9 exemplifies a microstructured foil.

Figure 10:
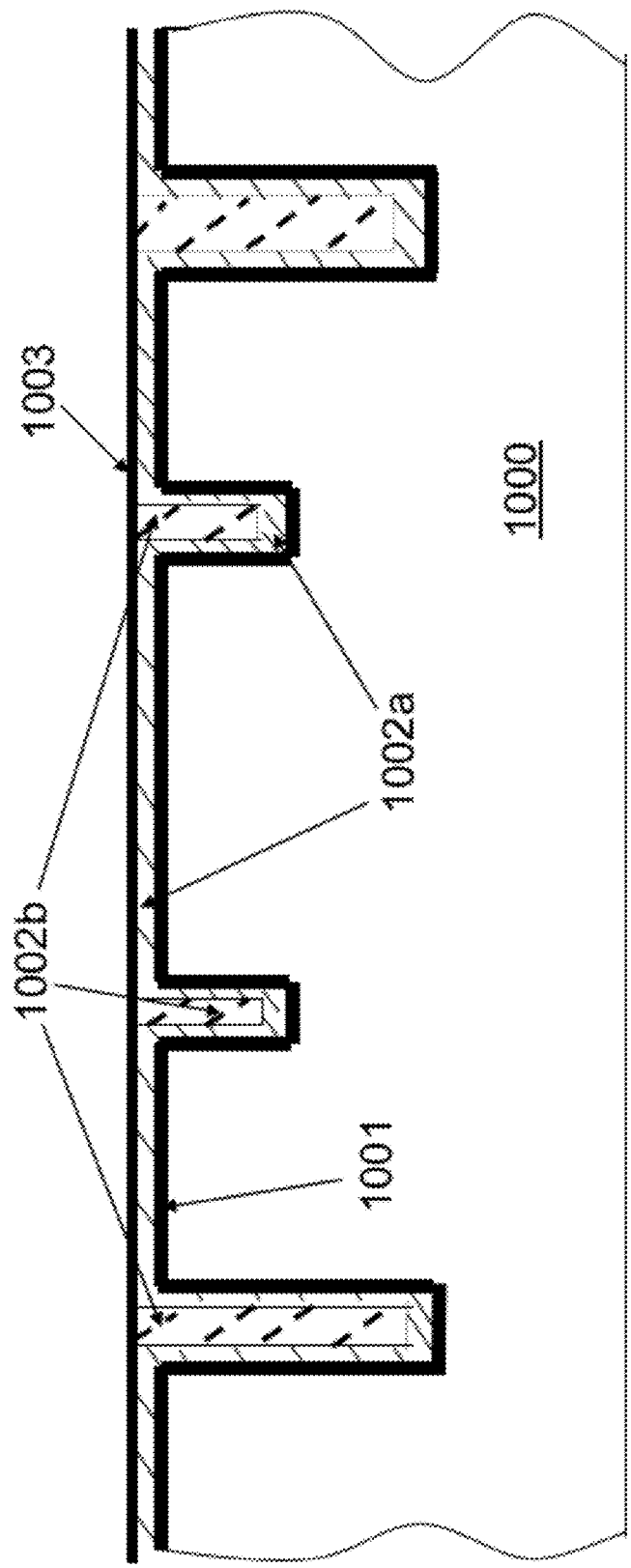
FIG. 10 is a cross-sectional view of an embodiment of the invention wherein a conforming and non-conforming dielectric layers are used and wherein an upper surface of the two dielectrics are at a same level such that a deposited absorber layer thereover is planar.

Turning now to the device of FIG. 10 shown in cross section, the microstructure substrate 1000 is shown coated with a reflector layer 1001, which is coated with a conforming first dielectric layer 1002a. A second non-confirming polymeric layer 1002*b* is coated and only fills in trenches or grooves within the coated substrate 1001. Absorber layer 1003 is coated as a top layer forming together with the other coated layers a color-shifting filter. In practice this could be achieved by eliminating the top of the polymeric dielectric of FIG. 9, for example by ion bombarding under vacuum until reaching suitable level of the inorganic oxide layer prior to the deposition of the absorber layer.

Figure 11:
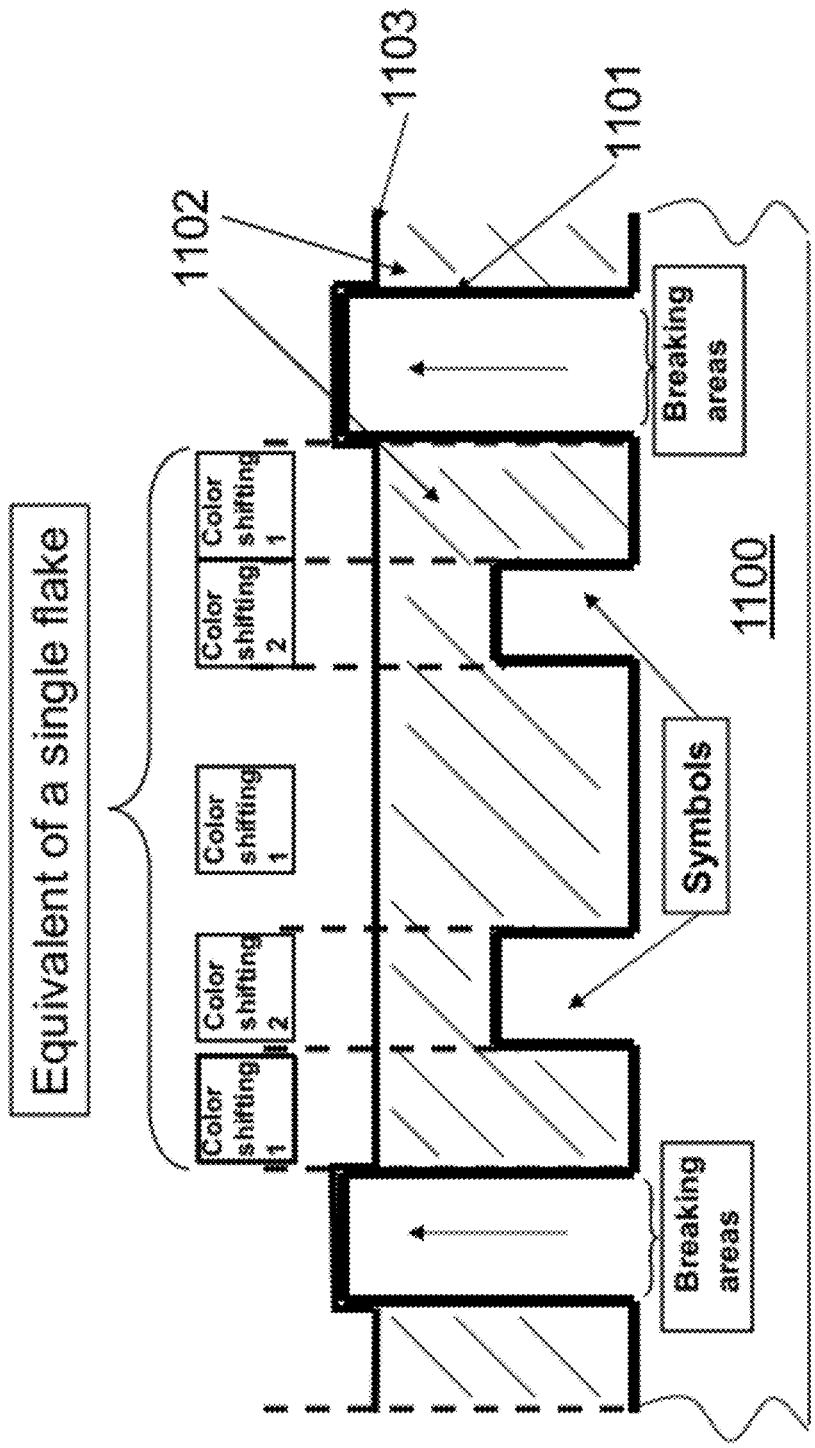
FIG. 11 is a cross-sectional view of a microstructured substrate having a release coat for forming flakes in accordance with this invention.

An alternative embodiment of the invention described heretofore is shown in FIG. 11. In this instance a substrate 1100 having protuberances or upstanding structures is shown. This embodiment lends itself more to applying a release layer than the previously described structures. If a release layer is applied, it is first applied prior to depositing the reflector layer 1101, so that the reflector layer and subsequent deposited layer can together be released from the substrate. The organic non-conforming dielectric layer 1102 is deposited to a level lower than the higher areas that will be used as braking points to produce the shaped flakes. Only the thin layers corresponding to the reflector 1101 and absorber 1103 will be in the top of these areas. After separating the multilayer from the substrate and forming shaped flakes, these flakes will have different properties when viewed from different sides. When viewed from the side having a reflector layer, the flakes will simply be reflective. However on the opposite side, a viewer with magnification would see the logos or symbols with a color shifting exhibited surrounded by a background of a different color. From the reflective side logos may be discernible however the color will correspond to that of the reflector layer.

In an alternative embodiment if the absorber layer is not applied, the top of the higher areas have a thin metal layer exposed surrounded by a dielectric layer. In this instance, the top areas can be used as seed point to grow preferentially other layers, for example one can perform electroplating using the exposed metallic layer as electrodes. Such devices can be used for other applications such as for sensors where micro exposed metallic layers are necessary.

Figure 12:
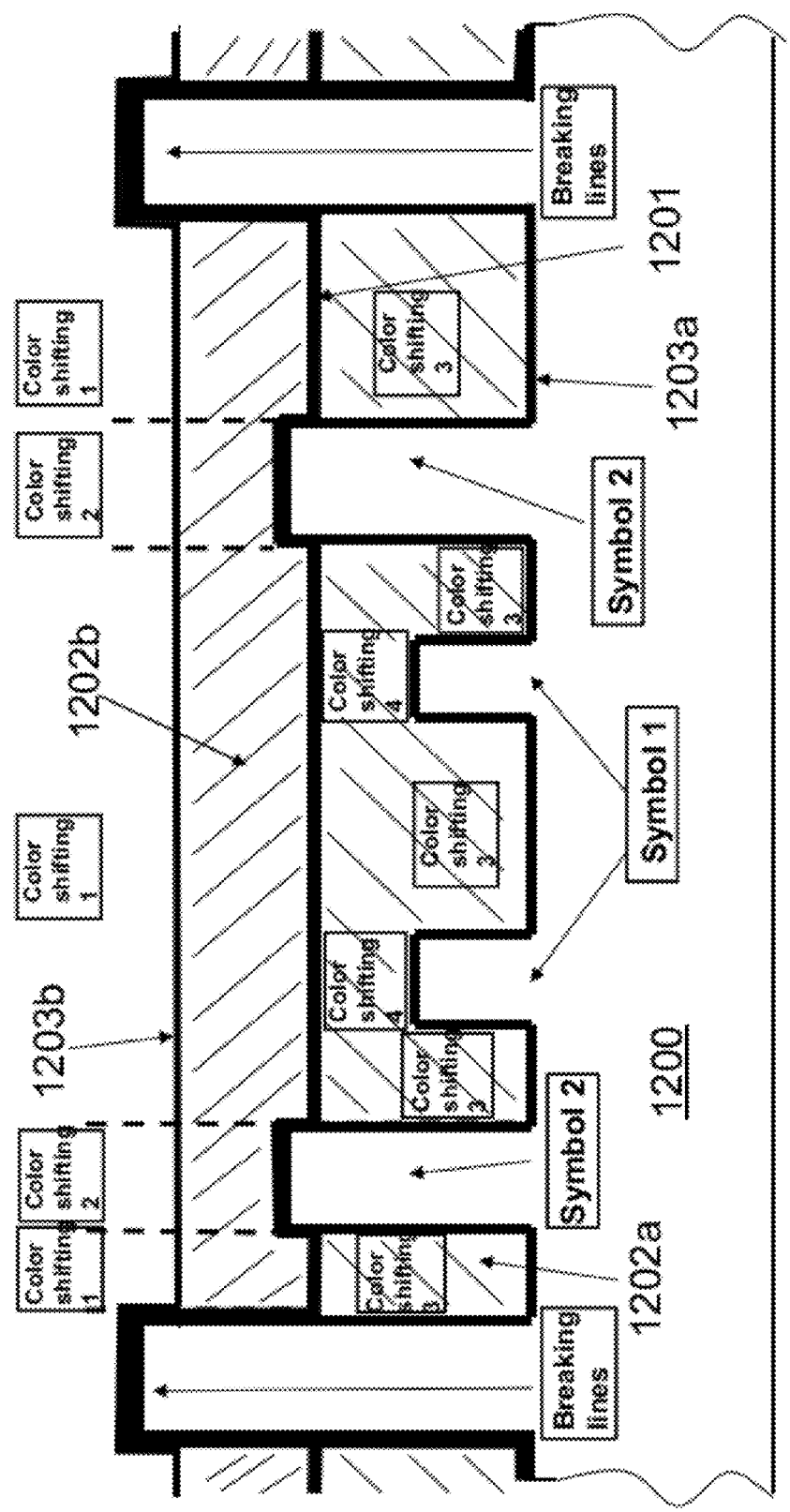
FIG. 12 is a cross-sectional view of a coating for forming a shaped flake in accordance with this invention wherein conforming and non-conforming layers are used and wherein a reflective layer is a central layer such that the flake is color shifting when viewed from either side.

An embodiment similar to that shown in FIG. 11 is shown in FIG. 12 however the multilayer Fabry-Perot filter is formed of a five-layer structure with layers A/D/R/D/A. Since the reflector layer 1201 is shown as a central layer, color shifting will be seen from both sides of this flake after it is released from the substrate 1200. Upon the substrate is a release layer, not shown and a first absorber layer 1203*a*. Upon the first absorber layer is a first non-conforming dielectric layer 1202*a*. The reflector layer 1201 is shown deposited upon the first dielectric layer 1202*a*. A second non-conforming dielectric layer 1202*b* is deposited over the reflector layer 1201 and a conforming $2^{nd}$ absorber layer 1203*b* is deposited over the second non-conforming dielectric layer 1202*b*. After releasing the multilayer, the shaped flakes when broken along the breaking lines, exhibit on side 1 the Symbol 2 with a non-shifting color corresponding to Absorber/Reflector and symbol 1 corresponding to a color shifting (CS4) from the multilayer Absorber/Dielectric/Reflector surrounded by another color shifting background (CS3).

When viewed on side 2 the flake will show a color-shifting (CS2) symbol 2 with a background of a different color (CS1). Symbol 1 will not be seen due to the presence of the opaque reflector layer. Since these flakes are small and below resolution that can be seen with an unaided eye, magnification would be required to see these aforementioned features.

Figure 13:
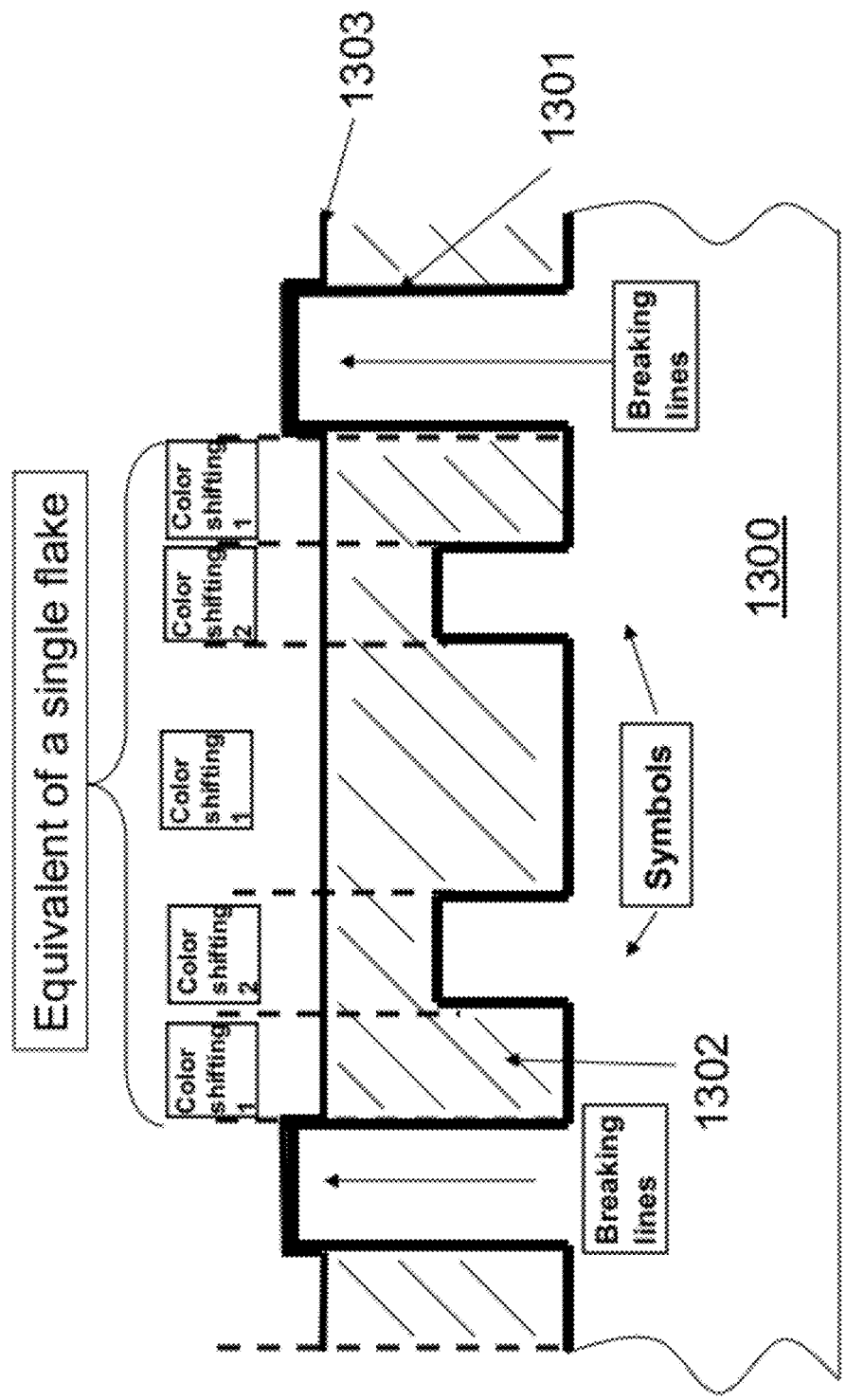
FIG. 13 is cross-sectional view of an alternative embodiment wherein a reflector layer is not required and is replaced with an additional absorber layer wherein color shifting is seen from both sides.

The embodiment shown in FIG. 13 differs to the embodiment shown in FIG. 11 in the optical design used to create the thin-film interference. In FIG. 13 a microstructured substrate 1300 is shown having a first conforming absorber layer 1301 instead of a reflector layer. A non-conforming dielectric layer 1302 is coated over layer 1301 and a conforming $2^{nd}$ absorber layer 1303 is coated over the dielectric layer. Thin film interference is obtained by this three-layer Absorber/Dielectric/Absorber design. Such optical designs are semi transparent. If coated on a substrate with the features up shown in a previous embodiment with logos with a single height, the shaped flakes will show the symbols with a different color than their background in both sides. If the symbols have more than one height in cross-section, different areas of the logo will show different colors.

In all instances, the variation in the thickness of the dielectric layer is much greater than the thickness of each of the two layers adjacent the dielectric layer.

By depositing a non-conforming dielectric spacer layer in a Fabry-Perot structure, this invention allows for the fabrication of filters which have a varying thickness spacer layer and wherein the thickness can be precisely controlled. This allows for a single layer be it either continuous or segmented to provide different color shifting in different regions across the filter as function of the spacer layer thickness. Either flakes or foil can be made. Typically the non-conforming dielectric layer is coated over a conforming layer and covered with a conforming layer, however the dielectric layer could be coated over a non-conforming layer or may be covered with a non-conforming layer.

What is claimed is:

1. A color shifting security device comprising:
a first absorbing or reflecting layer having a microstructured upper surface;
a second absorbing or reflecting layer; and
an infill dielectric non-conforming layer, filling in grooves within the microstructured upper surface, having a surface contacting and complementary with the microstructured upper surface, and disposed between the first absorbing or reflecting layer and the second absorbing or reflecting layer, wherein at least one of the first or second absorbing or reflecting layers is an absorbing layer, and wherein a cross section of the infill dielectric non-conforming layer has a varying thickness such that at least one region is substantially thicker than a thinner adjacent region of the infill dielectric non-conforming layer.

2. The color shifting security device as defined in claim 1, wherein the first absorbing or reflecting layer, the second absorbing or reflecting layer, and the infill dielectric non-conforming layer, together form a Fabry-Perot cavity, and wherein the infill dielectric non-conforming layer is formed of a deposited non-conforming material.

3. The color shifting security device as defined in claim 2, wherein the first absorbing or reflecting layer, or the second absorbing or reflecting layer, has a substantially uniform thickness, which varies by no more than 20%.

4. The color shifting security device as defined in claim 2, wherein a difference in thickness of a cross-section of the infill dielectric non-conforming layer is more than ⅛ wavelengths of visible light and less than 8 quarter wavelengths of visible light.

5. The color shifting security device as defined in claim 4, wherein regions of the color shifting security device corresponding to particular microstructures form visible indicia that can be seen with magnification, and wherein a height or depth of some of the particular microstructures are at least 50 nm.

6. The color shifting security device, as defined in claim 5, wherein at least some of the particular microstructures form valleys, which in cross-section form flat-bottomed valleys.

7. The color shifting security device as defined in claim 6, wherein a substrate of the color shifting security device and the first absorbing or reflecting layer and the second absorbing or reflecting layer thereon form a foil.

8. The color shifting security device as defined in claim 6, wherein the first absorbing or reflecting layer and the second absorbing or reflecting layer are conforming deposited layers.

9. The color shifting security device as defined in claim 8, wherein the second conforming deposited layer is a reflector layer and wherein the color shifting security device further comprises:
a second dielectric non-conforming layer contacting the reflector layer and having an absorbing layer over the second dielectric non-conforming layer, thereby forming a two-sided color shifting device, wherein the infill dielectric non-conforming layer and the second dielectric non-conforming layer both have a varying thickness in cross-section.

10. The color shifting security device as defined in claim 5, wherein peaks of the particular microstructures in cross-section are flat-topped structures.

11. The color-shifting security device as defined in claim 2, wherein the Fabry-Perot cavity forms a flake after being removed from a substrate of the color shifting security device.

12. The color shifting security device as defined in claim 1, wherein a substrate of the color shifting security device has microstructures corresponding to a microstructured upper surface of the first absorbing or reflecting layer.

13. The color shifting security device as defined in claim 8, further comprising a Fabry-Perot cavity that includes layers that are located upon a same side of the substrate as the microstructures.

14. The color shifting security device as defined in claim 13, wherein the first absorbing or reflecting layer is a conforming layer and is coated directly upon the substrate or upon a release layer supported by the substrate.

15. The color shifting security device as defined in claim 14, wherein the microstructures define a logo or discernible indicia.

16. The color shifting security device as defined in claim 1, wherein the infill dielectric non-conforming layer contacts the second absorbing or reflecting layer.

17. The color shifting security device as defined in claim 1, wherein the infill dielectric non-conforming layer is a discontinuous layer having gaps between regions of different thickness of dielectric material.

18. The color shifting security device as defined in claim 17, wherein the gaps are defined by a presence of a first material, which forms separations between the regions.

19. A security device comprising:
a Fabry-Perot cavity having:
a first layer having a microstructured upper surface,
a second layer, and
an infill dielectric non-conforming layer having an upper surface and a lower surface disposed between the microstructured upper surface of the first layer and the second layer,
wherein the lower surface of the infill dielectric non-conforming layer conforms to the microstructured upper surface of the first layer,
wherein the upper surface of the infill dielectric non-conforming layer forms a planar surface and does not conform to the microstructured upper surface of the first layer,
wherein a cross section of the infill dielectric non-conforming layer has a varying thickness such that at least one region is substantially thicker than an adjacent region, and
wherein
the first and second layers are absorber layers, or
one of the first or second layers is a reflector layer and the other of the first or second layers is an absorber layer.

20. A color shifting security device, which exhibits two different colors from a same viewing location, comprising:
one or more deposited layers forming a microstructure, wherein at least one of the one or more deposited layers is a reflecting or absorbing layer;
an infill non-conforming dielectric material filling in grooves within the microstructure to form a planar surface over a continuous region of the microstructure; and p1 an absorbing or reflective cover layer covering at least a part of the continuous region, wherein the one or more deposited layers or the absorbing or reflective cover layer is an absorber layer.

* * * * *

UNITED STATES PATENT AND TRADEMARK OFFICE
CERTIFICATE OF CORRECTION

PATENT NO. : 9,561,682 B2
APPLICATION NO. : 13/530918
DATED : February 7, 2017
INVENTOR(S) : Paul T. Kohlmann et al.

Page 1 of 1

It is certified that error appears in the above-identified patent and that said Letters Patent is hereby corrected as shown below:

Column 11, Line 39, Claim 13 change "8, further comprising a Fabry-Perot cavity that includes" to --12, further comprising a Fabry-Perot cavity that includes--

Column 12, Line 43, Claim 20 change "and p1 an absorbing or reflective cover layer covering" to --and an absorbing or reflective cover layer covering--

Signed and Sealed this
Ninth Day of May, 2017

Michelle K. Lee
*Director of the United States Patent and Trademark Office*